United States Patent [19]

Mitra et al.

[11] Patent Number: 5,732,328

[45] Date of Patent: Mar. 24, 1998

[54] METHOD FOR POWER CONTROL IN WIRELESS NETWORKS FOR COMMUNICATING MULTIPLE INFORMATION CLASSES

[75] Inventors: Debasis Mitra, Summit; John A. Morrison, New Providence, both of N.J.

[73] Assignee: Lucent Technologies Inc., Murray Hill, N.J.

[21] Appl. No.: 812,627

[22] Filed: Mar. 7, 1997

Related U.S. Application Data

[63] Continuation-in-part of Ser. No. 429,260, Apr. 25, 1995.

[51] Int. Cl.$^6$ .............................. H04B 1/00; H04B 7/00
[52] U.S. Cl. .............................. 455/69; 455/70; 455/522
[58] Field of Search .................................. 455/522, 524, 455/63, 67.1, 67.3, 69, 70, 501, 116; 375/285

[56] References Cited

U.S. PATENT DOCUMENTS

| | | | |
|---|---|---|---|
| 5,212,823 | 5/1993 | Fuji et al. | 455/522 |
| 5,241,690 | 8/1993 | Larsson et al. | 455/522 |
| 5,265,119 | 11/1993 | Gilhousen et al. | 455/69 |
| 5,509,002 | 4/1996 | Baden et al. | 455/67.3 |
| 5,548,800 | 8/1996 | Olds et al. | 455/69 |
| 5,551,057 | 8/1996 | Mitra | 455/522 |
| 5,574,982 | 11/1996 | Almgren et al. | 455/69 |
| 5,604,730 | 2/1997 | Tiedemann, Jr. | 455/69 |

OTHER PUBLICATIONS

J. Zander, "Distributed Cochannel Interference Control in Cellular Radio Systems," *IEEE Trans. Vehic. Tech.*, v. 41(3), pp. 305–311 (1992).

G. J. Foschini et al., "A Simple Distributed Autonomous Power Control Algorithm and Its Convergence," *IEEE Trans. Vehic. Tech.*, v. 42(4), pp. 641–646 (1993).

A. J. Viterbi, *CDMA–Principles of Spread Spectrum Communication*, ch. 4.7, pp. 113–119 (Addison–Wesley Pub. Co. 1995).

S. V. Hanly, "An Algorithm for combined Cell–Site Selection and Power Control to Maximize Cellular Spread Spectrum Capacity", *IEEE J. Selected Areas in Comm.*, v. 13, No. 7, pp. 1332–1340 (1995).

R. D. Yates, "A Framework for Uplink Power control in Cellular Radio Systems", *IEEE J. Selected Areas in Comm.*, v. 13, No. 7, pp. 1341–1347 (1995).

L. C. Yun et al., "Variable Quality of Service in CDMA Systems by Statistical Power Control", *IEEE Int'l conf. on Comm. ICC '95 Seattle*, pp. 713–719 (1995).

W.C.Y. Lee, *Mobile Cellular Telecommunications Systems*, ch. 3, pp. 67–96 (McGraw–Hill Pub. Co. 1989).

A.J. Viterbi, *CDMA–Principles of Spread Spectrum Communication*, ch. 6.6, pp. 199–218 (Addison–Wesley Pub. Co. 1995).

*Primary Examiner*—Reinhard J. Eisenzopf
*Assistant Examiner*—Marsha D. Banks-Harold
*Attorney, Agent, or Firm*—Robert E. Rudnick

[57] ABSTRACT

Transmission power of a wireless terminal for transmitting a signal representing information of a particular information class to a base station capable of receiving signals for a plurality of information classes is determined based on a probability measure indicating received signal outage durations that would likely occur over a time interval. Moreover, the transmission power is determined to achieve probable signal outage durations according to the measure that are tolerable for the particular information class to be transmitted. The probability measure is further based on an enhanced characterization of a variation and mean of the detected signal interference magnitude over a time interval. Respective differences in the tolerable signal outage intervals for different information classes, such as voice, audio or video or data, and the corresponding enhanced interference characterization enable transmission of signals representing the information classes at desirably respective low power levels while still providing an acceptable quality of service relative to conventional power control techniques. Such low transmission powers tend to contribute less interference to the communication system and enable greater communication capacity.

15 Claims, 3 Drawing Sheets

METHOD FOR POWER CONTROL IN WIRELESS NETWORKS FOR COMMUNICATING MULTIPLE INFORMATION CLASSES

This is a continuation-in-part patent application of commonly assigned co-pending U.S. patent application Ser. No. 08/429,260, filed Apr. 25, 1995, entitled "A Method and Apparatus for Power Control In Wireless Networks," which is incorporated by reference herein.

FIELD OF THE INVENTION

Wireless communication methods and systems.

BACKGROUND OF THE INVENTION

In wireless communication networks such as conventional cellular systems, several base stations disposed throughout a particular geographic area are coupled to a master controller called a mobile telephone switching office (MTSO). The MTSO controls the base stations and provides an interface connection to the public switched telephone network (PSTN). The base stations have co-located transmitters and receivers and provide wireless links to wireless terminals, such as cellular telephones, located within respective geographical regions referred to as cells.

In conventional wireless systems employing frequency-modulated communication channels, each conventional base station uses pre-assigned channel sets to communicate with mobile units in a service area covered by the base station. Each channel set typically includes a pair of carrier frequencies with each carrier frequency being used for respective up-link or down-link communications with a wireless terminal. Neighboring base stations use different channel sets to avoid interference on the same channel or adjacent channels. Interference between communications from different wireless terminals operating on the same uplink channels is kept to acceptable levels by permitting each cell in the network to use only a subset of the channels available to the cellular network with geographically adjacent cells having no channels in common. Channels are reused by base stations that are far enough apart so that any interference is below acceptable levels.

Establishing and maintaining greater numbers of calls over a wireless network is a continuing goal for wireless communication service providers. Accordingly, a need exists for increasing the calls that a base station can maintain simultaneously. Nevertheless, conventional channel reuse techniques drastically limit the number of channels useable for each cell if acceptable levels of interference are maintained. Digital wireless communication techniques including time division multiple access (TDMA) and code division multiple access (CDMA) such as, for example, those defined by Telecommunication Industry Association Interim Standards 136 and 95, respectively, are currently being implemented to increase base station capacity. In TDMA and CDMA communication techniques, the quality of service in providing the communication link is based on the ratio of the power level of a desired communication signal received at a base station to the power level of all other received signals at that base station. Such ratio is referred to as signal-to-noise (S/N) or carrier-to-interference (C/I) ratios.

If a signal transmitted by a wireless terminal is received by a base station at a power level that is too low relative to received interference, then a degraded communication quality results. In contrast, if a transmitted signal is at too high a power setting relative to that necessary for the base station to receive such signal, then such high power transmission contributes greater interference to other signals received by that base station as well as neighboring base stations. This increased interference can degrade communication quality for other communication signals as well as limit call capacity of the base stations. Thus, a goal has been to control wireless terminal transmission power to produce a signal received at a base station with a C/I ratio satisfying a desired quality of service while providing desirably low interference to the intended destination base station and its neighboring base stations. Such reduced interference enables a greater number of channels to be used by the base stations increasing call capacity.

Conventional power control techniques typically adjust wireless terminal transmission powers based on a determination of the mean or average of the interference level at a base station. Examples of such power control techniques are provided in J. Zander, "Distributed Cochannel Interference Control in Cellular Radio Systems," *IEEE Trans. Vehic. Tech.*, v. 41(3), pp. 305–311 (Aug. 1992); G. J. Foschini et al., "A Simple Distributed Autonomous Power Control Algorithm and Its Convergence," *IEEE Trans. Vehic. Tech.*, v. 42(4), pp. 641–646 (Nov. 1993) and A. J. Viterbi, *CDMA-Principles of Spread Spectrum Communication*, ch. 4.7, pp. 113–119 (Addison-Wesley Pub. Co. 1995), S. V. Hardy, "An Algorithm for Combined Cell-Site Selection and Power Control to Maximize Cellular Spread Spectrum Capacity", *IEEE J. Selected Areas in Comm.*, v. 13, no. 7, pp. 1332–1340 (Sept. 1995); and R. D. Yates, "A Framework for Uplink Power Control in Cellular Radio Systems", *IEEE J. Selected Areas in Comm.*, v.13, no. 7, pp. 1341–1347 (Sept. 1995). However, the use of the simple mean of the received interference in determining the wireless terminal transmission power often produces a power level that is higher than necessary causing higher than necessary levels of interference to the base stations. As a result, connection capacity in such systems are still overly limited.

Particular wireless systems are also capable of simultaneously communicating various different classes of information such as signals representing voice, audio, video and data between base stations and wireless terminals. These systems are advantageously useable with particular wired-networks, such as the Internet or broadband ISDN (B-ISDN). Conventional B-ISDN networks employ asynchronous transfer mode packet switching for the reliable, high-speed transmission of the various information classes among communication devices. L. C. Yun and D. C. Messerschmitt, "Variable Quality of Service in CDMA Systems by Statistical Power Control", *IEEE Int'l Conf. on Comm. ICC '95 Seattle*, pp. 713–719 (June 1995), which is incorporated by reference herein, describes a CDMA wireless system that uses wireless terminal power control based on the particular information class to be transmitted to increase call capacity. This CDMA system controls wireless terminal transmission power based on a desired S/N received by the base station that meets a quality of service commitment made to a customer for communication of that particular information class.

However, this CDMA system undesirably limits wireless link capacity because it determines transmission power levels for meeting desired S/N ratios based on the mean of detected interference. Thus, as in the previously described TDMA and CDMA systems, power levels tend to be set higher than necessary causing greater interference to other base stations in the network and limiting their communication link capacity.

Accordingly, a power control technique for exchanging signals representing a plurality of information classes that does not unnecessarily limit communication link capacity in a wireless network is very desirable.

SUMMARY OF THE INVENTION

The invention concerns methods for setting transmission power of a wireless terminal for transmitting a signal representing information of a particular information class to a base station capable of receiving signals for a plurality of information classes. In particular, the transmission power is set such that the corresponding received signal strength would have a probability of signal outage durations over a time interval that are tolerable for the particular information class represented in the signal. Signal outage refers to an approximate portion of a time interval in which a received data signal does not meet a desired quality of service such as, for example, a desired C/I ratio.

The invention is based, in part, on the realization that different information classes have different characteristics, such as encoded redundancies, that enable reception of a data signal of such information classes with typically different sensitivities to outage interval durations. For instance, the transmission of data, such as text or numbers tends to be more sensitive to outage than the transmission of voice, audio or video signals. As a consequence, it is possible to transmit voice, audio or video signals at desirably respective lower power levels often producing longer outage intervals while still maintaining an acceptable quality of service. Such lower transmission powers produce less interference to the intended destination base station as well as neighboring base stations enabling greater communication capacity.

The transmission power determination according to the invention relies on a probability measure based on a mean or average value of detected signal interference as well as a variation of such interference from the mean over a time interval. In one embodiment, a variation in the form of a standard deviation and the mean value of signal interference are detected over a first interval and used for determining the probability measure of signal outage and corresponding transmission power setting for a second time interval. The power control methods of the invention advantageously tend to produce a lower power level setting than is possible with conventional transmission power control techniques.

Additional features and advantages of the present invention will become more readily apparent from the following detailed description and accompanying drawings.

DETAILED DESCRIPTION

The invention is directed to determining desirable transmission power settings for a wireless terminal to establish and/or maintain an uplink communication signal representing information of a particular information class with a base station capable of receiving signals representing a plurality of information classes. The invention is based on the realization that different information classes have different characteristics, such as encoded redundancies, that enable corresponding data signals of such information classes to be received with typically different tolerances to signal outage. Signal outage refers to an approximate portion of a time interval in which a received data signal does not meet a desired quality of service such as, for example, a desired C/I ratio.

For example, transmission of data, such as text or numerical information, typically tends to be more sensitive to signal outage than the transmission of voice, audio or video signals. As a consequence, it is possible to transmit voice, audio or video signals at desirably respective lower power levels often producing greater outage intervals than the corresponding data signals which are tolerable to maintain an acceptable level of quality of service. Such lower transmission powers produce less interference to communications with the intended destination and neighboring base stations in a wireless network enabling greater communication capacity.

In accordance with the invention, an outage probability measure is advantageously used for determining a desired signal strength to be received by a base station for a signal of a particular information class that would likely produce signal outage intervals that are tolerable for that particular information class. An enhanced characterization of the signal interference magnitude detected by a base station of a mean value as well as a variation measure from such mean value, such as variance or standard deviation, is advantageously used according to the invention to determine the outage probability measure.

Upon determining the desired signal strength to be received by the base station according to the invention, it is then possible to set the corresponding wireless terminal transmission power by numerous different techniques. However, the particular method steps employed for setting such wireless terminal transmission power is not critical to practicing the invention. Several different wireless terminal transmission power setting methods are described below with regard to the drawings for illustration only and are not meant to be a limitation of the invention.

Figure 1:
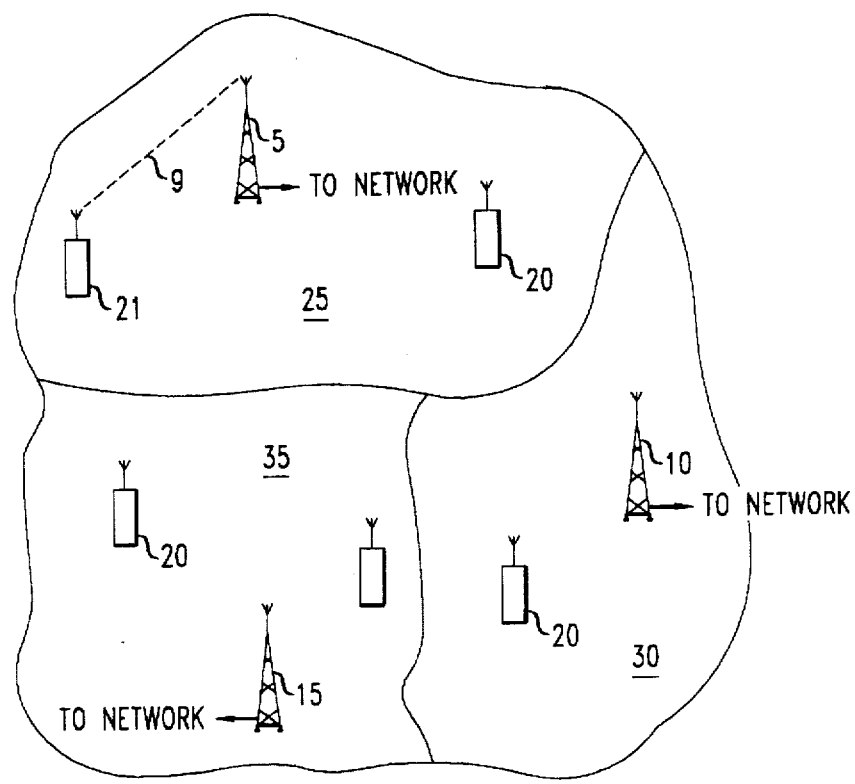
FIG. 1 illustrates a schematic block diagram of an exemplary wireless network having at least one base station in accordance with the invention.

An exemplary wireless communication network 1 capable of receiving signals representing a plurality of information classes is shown in FIG. 1. The system 1 includes three base stations 5, 10 and 15 (5–15) individually linked to a wired-network such as, for example, a broadband ISDN network employing asynchronous transfer mode (ATM) packet switching or the Internet. It is alternatively possible for the base stations 5–15 to be collectively connected to such wired-networks through an intermediate bridging component such as a switching center.

The base stations 5–15 provide wireless communication with wireless terminals 20 located within respective geographic service areas 25, 30 and 35 (25–35) proximate the base stations 5–15. For example, the particular wireless terminal 20 having the alternative reference 21 is located in the service area 25 and communicates with the base station 5. The size of the exemplary service areas 25–35 are different due to the respective transmission powers of the base stations 5–15 and the environment in which the base stations 5–15 are operating. Overlap regions (not shown) exist between the service areas 25–35 to enable hand-offs between adjacent base stations to provide substantially uninterrupted communications of a mobile wireless terminal as it travels across service area boundaries. Suitable overlap regions include those used in conventional wireless systems and have not been shown for ease of illustration.

It is possible for the base stations 5–15 to have similar or identical components to conventional base stations such as those manufactured by Lucent Technologies Inc., Murray Hill, N.J. The components and operation of such base stations is provided in, for example, W. C. Y. Lee, *Mobile Cellular Telecommunications Systems*, ch. 3, pp. 67–96 (McGraw-Hill Pub. Co. 1989), incorporated by reference herein, as well as U.S. patent application Ser. No. 08/429, 260.

The network 1 enables wireless communication of different classes of information with the wireless terminals 20, including for example, communication of voice, audio, video and data such as text or numerical information. Moreover, an operator of the wireless network 1 typically has different quality of service commitments to wireless service subscribers for such corresponding different information classes. Exemplary quality of services commitments include a minimum C/I and the tolerable signal outage over an interval of time with which the minimum C/I is not satisfied. Exemplary values of the minimum C/I and corresponding probability requirement for data, voice and video information classes are provided with regard to FIG. 2. Typically, the maximum signal outage requirement for an information class of data such as text or numerical information is more stringent, e.g., lower, than the maximum signal outage requirement for information classes of voice and video due to the greater redundancies often included in conventional encoded representations of voice or video information.

It is possible for a wireless terminal 20 to be, for example, mobile units, such as cellular or PCS telephones or portable wireless modems for laptop computers or personal digital assistants (PDA's), or stationary units, such as wireless modems associated with desktop computers or multimedia components. Further, it possible for the network 1 to be a large-area outdoor network covering cities or portions of cities, or an indoor network or small outdoor network with a relatively small coverage area, such as an office building, mall or campus. The method of wireless communication employed by the network 1 is, for example, spread spectrum digital communications techniques including code division multiple access (CDMA), such as that adhering to the Telecommunication Industry Association Interim Standard 95. However, it is alternatively possible to use a time division multiple access (TDMA) scheme such as that adhering to the Telecommunication Industry Association Interim Standard 136, as well as other digital multiple access techniques.

Figure 2:
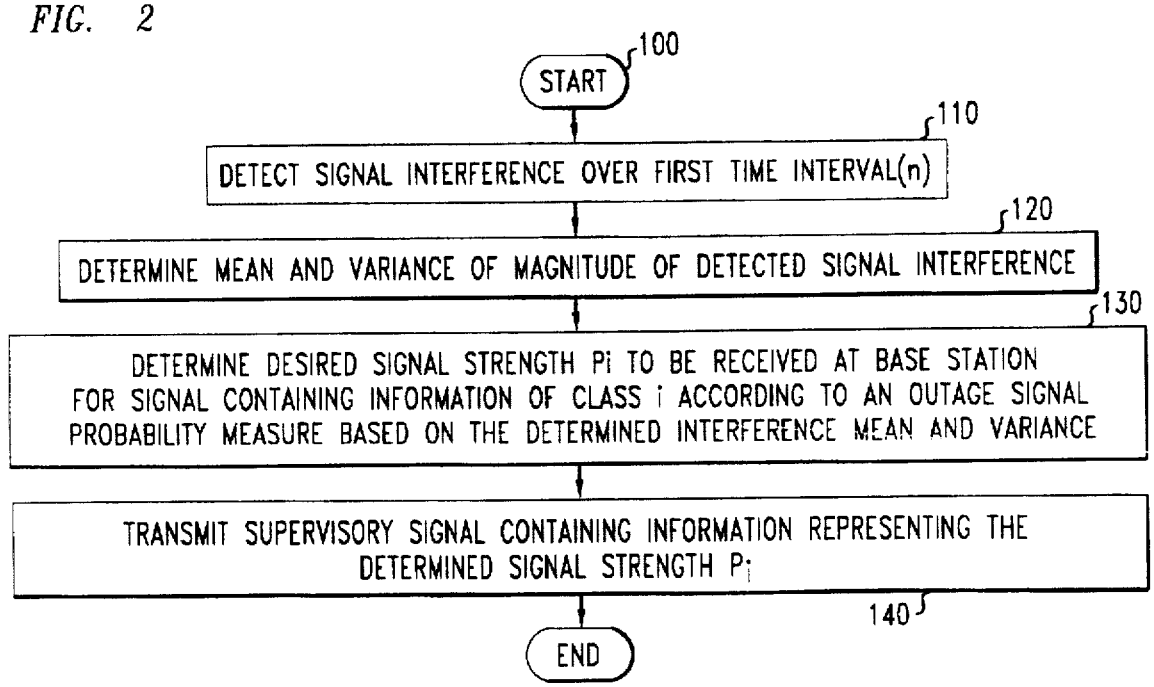
FIG. 2 illustrates a flow diagram of an exemplary method performed by the base station of FIG. 1.

FIG. 2 shows an exemplary method 100, in accordance with the invention, for more accurately determining advantageously low signal transmission power settings for a signal representing a particular information class for receipt by a base station with a tolerable signal outage probability for that information class. The method 100 is described with respect to an exemplary communication of a particular information class between the base station 5 and a particular wireless terminal 20, such as terminal 21, in its coverage area 25 of FIG. 1. In accordance with the method 100, the signal interference magnitude is detected at a first time interval (n) by the base station 5 in step 110. The signal interference magnitude corresponds to the total power received by the base station 5 over a bandwidth detectable by the base station 5 and is typically due to local receiver noise and signals received at the base station 5 from wireless terminals transmitting from inside and outside of the coverage area 25. It is possible for the intervals of time over which such signal interference is detected to be in the range of approximately, 1 msec. to 10 msec.

Figure 3:
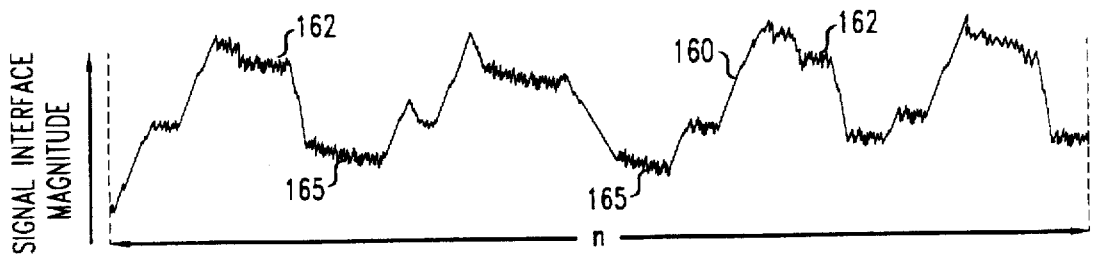
FIG. 3 illustrates a graphical representation of magnitude of exemplary signal interference detected by a base station of the wireless network of FIG. 1.

A representation of a magnitude 160 of exemplary signal interference detected by a base station, such as the base station 5, over a time interval (n) is depicted in FIG. 3. As illustrated in FIG. 3, detected signal interference is typically not constant and varies over the time interval with magnitude peaks 162 and valleys 165. Referring again to FIG. 2, after the signal interference magnitude is detected in step 110 of FIG. 2, a mean or average value $\bar{I}$ of such magnitude as well as a measure representing the variation of the magnitude from the mean $\bar{I}$, such as a variance value $\bar{V}$ or standard deviation $\sqrt{\bar{V}}$, is determined in step 120. In the alternative, it is possible to represent the variation measure by other values, groups of values, or functions that represent the variation of the detected interference magnitude from the mean value $\bar{I}$ over the time interval (n).

A desired signal strength $P_i$ to be received at the base station 5 at a second time interval (n+1) for signals to be transmitted by a wireless terminal representing a particular information class i is then determined in step 130. The desired received signal strength $P_i$ is determined based on a measure of signal outage that would likely be over the second time interval (n+1). Such outage signal probability measure relies on the enhanced characterization of the detected interference during the time interval (n) determined in step 120.

An exemplary method for determining the desired received signal strength $P_i$ according to the invention that further provides advantageous computational and processing efficiencies is the following Equation (1):

$$P_i(n+1) = \frac{\alpha_i}{W} \left[ \bar{I}(n) + v_i \sqrt{\bar{V}(n)} \right], \quad (1)$$

wherein $\alpha_i/W$ is the desired processing gain for transmission of the signal of information class i and $v_i$ is the outage probability quantile for information class i. This Equation (1) is based on the detected interference magnitude mean $\bar{I}$ and variance $\bar{V}$ in the form of a standard deviation $\sqrt{\bar{V}}$.

For CDMA communication, the values $\alpha_i$ and W for the desired processing gain $\alpha_i/W$ correspond to a data rate factor for substantially error-less transmission of a signal representing the respective information class i, and the spread spectrum transmission bandwidth, respectively. Such a data rate factor $\alpha_i$ is based on the data rate R for the information class i and the desired bit-energy-to-noise density ratio Eb/Io received at the base station for substantially error-less reception of a transmitted signal for that information class i.

More specifically, the data rate factor $\alpha_i$ can be determined from the relationship $\alpha i = Eb/Io \, R$. Typically, a desirable bit-energy-to-noise density ratio Eb/Io is approximately 6 dB for conventional base stations such that the data rate factor $\alpha i = (6 \, dB)R$. Moreover, typical values for W in a conventional CDMA are on the order of 1.2288 Mchips/sec.

However, the ratio $\alpha i/W$ is typically specified as part of the quality of service commitment for the respective information classes i. Exemplary values for the ratio $\alpha i/W$ for voice, data and video information classes are in the ranges of approximately 0.0167 to 0.04, 0.033 to 0.08, and 0.0667 to 0.160, respectively. Such values are based on similar quality of service measures for B-ISDN ATM networks and are not meant to be limitations of the invention. It is possible to use alternative values for the ratio $\alpha i/W$. [please fill in value].

In Equation (1), the outage probability quantile $v_i$ is based on a probability of signal outage over acceptable time intervals in the receipt of a data signal of the respective information class i. Since typical signal interference magnitude detected by a base station can be approximated as a Gaussian distribution, an advantageous method for determining the value $v_i$ for a particular class i is based on a corresponding Gaussian distribution:

$$1 - L_i = \frac{1}{\sqrt{2\pi}} \int_{-\infty}^{v_i} e^{-y^2/2} dy, \qquad (2)$$

wherein $L_i$ is the acceptable outage probability, or in other words, the approximate portion of the time interval of receipt of a data signal representing the information class i that signal outage occurs which is tolerable. The outage probability $L_i$ is described in, for example, A. J. Viterbi, *CDMA—Principles of Spread Spectrum Communication*, ch. 6.6, pp. 199–218 (Addison-Wesley Pub. Co. 1995), which is incorporated by reference herein. Exemplary values of the outage probability $L_i$ are on the order of $10^{-3}$, $10^{-4}$ and $10^{-3}$ for information classes of voice, data and video, respectively. Such outage probability values $L_i$ produce outage probability quantiles $v_i$ of 3.1, 3.75 and 3.1, respectively. Such exemplary values are provided for illustration purpose only and other values are useable for the indicator $L_i$ and quantile $v_i$ based on the desired communication quality and link capacity of network 1 of FIG. 1.

Referring again to FIG. 2, upon determining the desired signal power $P_i$ to be received at the base station 5 for a signal representing a particular information class i in step 130, the method 200 causes the base station 5 of FIG. 1 to generate and transmit a supervisory signal to the wireless terminals in its coverage area 25 in step 140. This supervisory signal includes information regarding the signal power $P_i$ that is desired for the base station 5 to receive a signal representing the particular information class i. Also, information regarding the transmission power of the supervisory signal can optionally be represented in the supervisory signal for use by the wireless terminals 20 of FIG. 1 as is described with regard to FIG. 5.

It is desirable to perform the method 100 of FIG. 2 at successive intervals of a communication between a base station and a wireless terminal to successively adjust the wireless terminal transmission power. Further, in the alternative, it is possible for the method 100 to be performed at the initiation of and/or intermittently during transmission of signals by a wireless terminal to a base station according to the invention.

Moreover, it is possible for the base station 5 to perform the method 100 of FIG. 2 at the initiation of communication and/or intermittently during the communication or otherwise. The particular component or group of components that performs the individual steps of the method 100 is not critical to practicing the invention. It is possible for switching centers, such as mobile telephone switching centers, or additional components coupled to the base stations or switching centers, alone or in combination with the base stations, to perform the steps of the method 100. Moreover, it is possible for the base station 5 to intermittently transmit a supervisory signal or supervisory signals including information for the desired received signal strengths $P_i$ of the respective different information classes represented by different values i in a round robin or other ordered manner.

Figure 4:
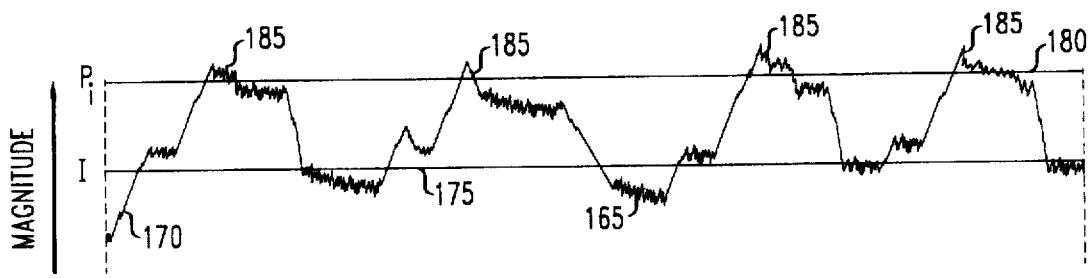
FIG. 4 illustrates a graphical representation of the interference magnitude scaled in accordance with the invention for determining wireless terminal transmission power.

In order to better illustrate the advantageous computational and processing efficiencies achievable by determining the desired received signal strength $P_i$ in accordance with the Equation (1), the relationship of the desired received signal power $P_i$ and signal interference magnitude is graphically depicted in FIG. 4. In FIG. 4, the magnitude of the signal interference 160, shown in FIG. 3, that was detected at time interval (n) is scaled by the processing gain ratio $\alpha i/W$ of Equation (1) to produce the waveform 170. A representation 175 of the scaled mean $\alpha i/W \bar{I}$ of the waveform 170 is shown superimposed over such waveform 170. An exemplary desired received signal strength $P_i$ for the time interval (n+1) is represented also as a superimposed line 180.

Particular regions 185 of the scaled interference waveform 170 have greater magnitudes than the desired signal strength 180. Such regions 185 provide a prediction of signal outage, if the depicted signal strength 180 was received in the subsequent time interval (n+1). More specifically, the portion of the time interval depicted in FIG. 4 represented by the cumulative regions 185 having a greater magnitude than the received signal strength $P_i$ 180 provides an approximation or probability of signal outage $L_i$ for the time interval (n+1), if the received signal strength is at the depicted magnitude 185.

Accordingly, it is possible to determine the desired received power level $P_i$ 180 such that the scaled interference waveform has regions, such as the regions 185, with a magnitude greater than the signal strength $P_i$ 180 that represent a portion of the time interval corresponding to the tolerable signal outage probability $L_i$ for the information class i. For example, if the tolerable signal outage probability $L_i$ for a particular information class i is 0.05, then the desired signal strength $P_i$ 180 for receipt of a signal representing such information class should be set such that 5% or less of the time interval corresponds to regions of the scaled interference waveform regions having greater signal magnitudes.

Moreover, in accordance with the invention, since the signal interference magnitude typically received by a base station can be approximated by a Gaussian distribution, it is possible to determine the desired received signal strength $P_i$ for a subsequent time interval advantageously from the scaled signal interference mean $\alpha i/W$ in combination with the interference standard deviation $\sqrt{V}$ as scaled by the processing gain and the outage probability quantile $v_i$ as represented in the previous Equation (1) with the quantile $v_i$ determined in accordance with previous Equation (2).

In this manner, it is possible for respective outage probability quantile values $v_i$ to advantageously be generated based on the tolerable outage probabilities for the respective different information classes i and stored in a memory in an off-line process when wireless communication is not occurring. Likewise, the desired processing gain $\alpha i/W$ can also be determined and stored in memory prior to establishing communications. Then, when establishing communication and/or intermittently during communication, new desired received power levels can be determined in accordance with the previous Equation (1) by multiplying such stored values by the respective stored processing gain and outage probability quantile values $\alpha i/W$ and $v_i$ at the initiation of, and/or intermittently during, wireless communication.

Although the invention has been described with respect to using variance and standard deviation in conjunction with the outage probability quantile $v_i$, it should be readily understood that it is alternatively possible to determine the desired received signal strength $P_i$ based on other measures of the variation of the detected interference signal relative to the mean $\bar{I}$ and other measures representing the tolerable signal outage probability according to the invention.

Figure 5:
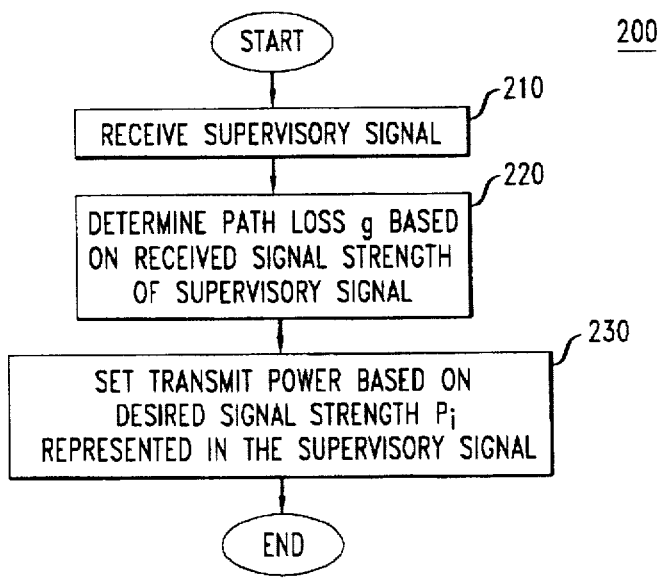
FIG. 5 illustrates a flow diagram of an exemplary method performed by a wireless terminal for communicating with a base station performing the method of FIG. 2.

FIG. 5 shows a method 200 for setting transmission power $P_{WT}$ of a wireless terminal based on the supervisory signal transmitted by the base station 5 according to step 140 of FIG. 2. In the method 200, the supervisory signal is received by the wireless terminal in step 210 and the desired signal strength value $P_i$ is read. Then, in step 220, path loss g between that wireless terminal 21 and the base station 5 is determined. It is possible for the wireless terminal to determine the path loss g by dividing the desired signal strength value $P_i$ by the detected power of the supervisory signal received by the wireless terminal. Several current digital communication standards include provisions for wireless terminals to detect received signal strengths including the mobile assisted hand-off (MAHO) and mobile assisted channel allocation (MACA) features of IS-136.

It is also possible for the supervisory signal to include information about the power level at which such supervisory signal is transmitted which can also be read by the wireless terminal 21. In the alternative, the transmit power level of the supervisory signal can be a known value to the wireless terminals, such as, for example, the transmit power level is fixed or determined according to a schedule known by both the wireless terminal 21 and the base station 5. Such exemplary methods for determining the path loss g are useable for those base stations and wireless terminals wherein the uplink path loss and the downlink path loss are substantially similar, such as where the transmitting and receiving antenna's of the base station and wireless terminal are respectively co-located. However, if the uplink and downlink path losses are not substantially similar, then alternative techniques are useable for determining the uplink path loss g in accordance with the invention.

After the path loss g is determined in step 220, the transmit power level $P_{WT}$ is determined and set in step 230 in FIG. 5. It is possible to determine the transmit power level $P_{WT}$ for transmitting a signal representing a particular information class i by taking the ratio of the desired received signal strength $P_i$ at the base station obtained from the supervisory signal divided by the path loss g.

It is possible for the wireless terminal to perform the method 200, at the establishment of the communication link and/or intermittently during communication. In a network in which mobile wireless terminals are employed it is advantageous for the base station to transmit the supervisory signal intermittently, whether on a periodic basis or otherwise, and for the wireless terminal to perform the method 200 in a correspondingly intermittent manner to set its transmission power level $P_{WT}$ as the wireless terminal moves to different regions of the respective coverage area.

Figure 6:
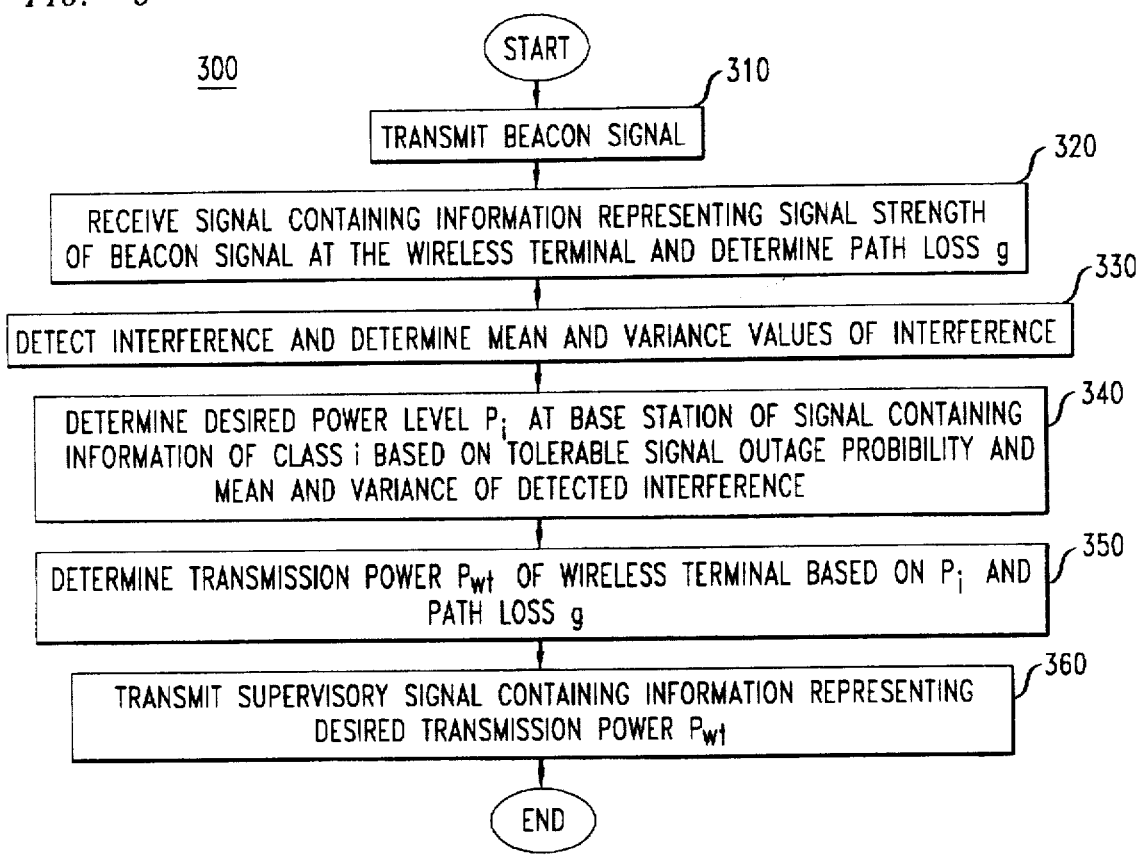
FIG. 6 illustrates a flow diagram of an exemplary method according to the invention for the base station of FIG. 1 that is an alternative to the method of FIG. 2.

FIG. 6 depicts an alternative exemplary method 300 to the method 100 of FIG. 2 that enables a component in the network 1 of FIG. 1, such as the base station 5, to determine the desirable power levels for the wireless terminals 20. Wireless terminals communicating is such a system need not determine their transmission power and only set their transmission power as instructed by a base station. The method 300 is described with respect to determining the transmit power $P_{WT}$ for the wireless terminal 21 for communicating with the base station 5 of FIG. 1.

In accordance with the method 300, the base station 5 transmits a beacon signal at a known power in step 310. It is desirable for the beacon signal to be transmitted on a particular channel not used for uplink and downlink communications so as not to interfere with such communications. The beacon signal is received by the wireless terminal 21 for which communication is to be established or maintained. The wireless terminal 21 detects the received signal strength of the beacon signal and transmits a signal back to the base station 5 indicating the received signal strength (RSS).

In step 320, the base station 5 receives the RSS signal and determines the path loss g between the wireless terminal 21 and the base station 5. It is possible to determine the path loss g by dividing the known transmit power of the beacon signal by the detected RSS value in the signal received from the wireless terminal 21. Then, in step 330, the base station 5 detects the interference and determines corresponding mean and variance values. The desired signal strength $P_i$ to be received by the base station 5 for a signal representing a particular information class i is then determined in step 340 based on these mean and variation, according to, for example, the previously provided Equation (1). The operations performed by steps 330 and 340 of FIG. 6 can be performed in a substantially identical manner to that previously described with respect to steps 110 through 130 of FIG. 2.

The transmission power $P_{WT}$ required by the wireless terminal 21 for transmitting a signal representing information of class i is determined in step 350 by the ratio of the desired received signal power $P_i$, determined in then step 340, to the determined path loss g, determined in step 320. A supervisory signal containing information representing this determined transmission power $P_{WT}$ is then transmitted to the wireless terminal 21 in step 360.

The steps of the method 300 have been shown in a particular exemplary order for illustration purposes only and are not meant to be a limitation of the invention. However, particular illustrated steps of the method 300 can be performed in a different order or concurrently. For instance, the beacon signal transmission of step 310 can be continuous or intermittent during the performance of the other steps. Also, step 320 in which the RSS signal is received can be performed concurrently with, or subsequent to, step 330 in which interference detection occurs.

Figure 7:
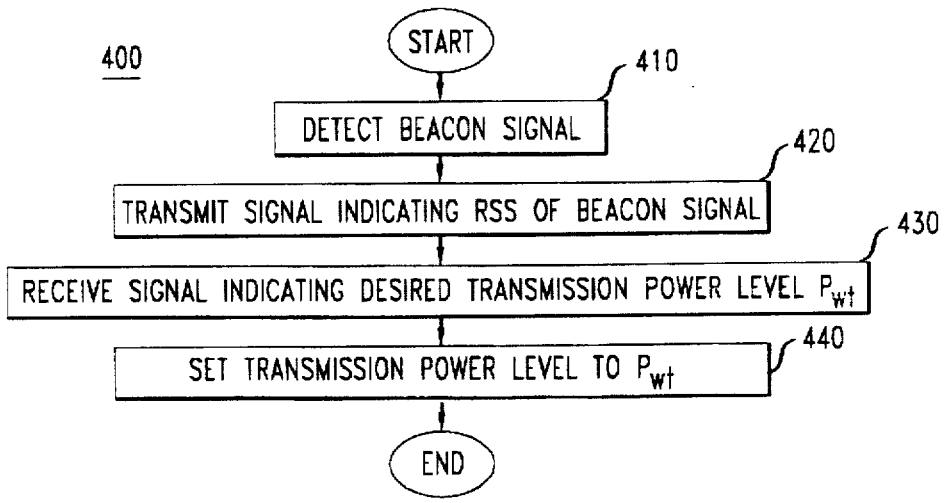
FIG. 7 illustrates a flow diagram of an exemplary method performed by a wireless terminal for communicating with a base station performing the method of FIG. 4.

FIG. 7 shows an exemplary method 400 performed by a wireless terminal for setting transmission power $P_{WT}$ in accordance with the method 300 of FIG. 6. In method 400, the received signal strength of the beacon signal transmitted in accordance with step 310 of FIG. 4 is detected in step 410. The wireless terminal then generates and transmits the corresponding RSS signal containing information of the signal strength of the received beacon signal to the base station in step 420. Then, in step 430, the wireless terminal receives the signal indicating the desired transmission power $P_{WT}$ to be used for transmitting uplink information in the information class as previously described with respect to step 350 of FIG. 6. Lastly, the wireless terminal sets its signal transmission power to desired transmission power $P_{WT}$. The method 400 for setting the transmission power can be performed by the wireless terminals 20 at times, for example, when the terminal is activated and registers with the base station, originates a call, and/or intermittently during a call or otherwise.

Although several embodiments of the invention have been described in detail above, many modifications can be made without departing from the teaching thereof. All of such modifications are intended to be encompassed within the following claims. For instance, it is possible to employ the desired received signal strength for a signal representing a particular information class i determined according to the invention with various other methods for determining the corresponding wireless terminal transmission power than that described with respect to FIGS. 2 to 5. Moreover, although the previously described methods applied to CDMA communications, it should be readily understood that the method of the invention is also useable for TDMA communication systems as well as other digital multiple access communication systems.

The invention claimed is:

1. A method for controlling wireless terminal transmission power within a wireless network, said network capable of communicating signals representing a plurality of information classes, said method comprising:

detecting a signal interference magnitude at a base station of said network over a first time interval;

determining a variation measure relative to a mean value $\bar{I}$ of the detected interference magnitude over said first time interval;

determining a desired received signal strength $P_i$ for a signal representing information of a particular information class i for a second time interval based on a probability measure $L_i$ of signal outage over a portion of said second time interval that is tolerable for said particular information class i, said probability measure based on said determined variation measure of said detected interference; and transmitting a supervisory signal to a wireless terminal, said supervisory signal including information based on said determined desired signal strength $P_i$ for receiving said particular class i of information.

2. The method of claim 1 wherein said step of determining a variation measure determines a variance value $\bar{V}$ of said detected interference magnitude.

3. The method of claim 2 wherein said step of determining the desired received signal strength $P_i$ is further based on a desired processing gain $\alpha_i/W$ of the particular information class i to be transmitted.

4. The method of claim 3 wherein said step of determining the desired received signal strength $P_i$ at said second time interval (n+1) is substantially based on the expression:

$$P_i(n+1) = \frac{\alpha_i}{W}[\bar{I}(n) + v_i\sqrt{\bar{V}(n)}],$$

wherein $v_i$ is an outage probability quantile for said information class i and (n) represents said first time interval.

5. The method of claim 4 wherein said outage probability quantile $v_i$ for information class i substantially satisfies the expression:

$$1 - L_i = \frac{1}{\sqrt{2\pi}} \int_{-\infty}^{v_i} e^{-y^2/2} dy.$$

6. The method of claim 2 wherein said step of determining the desired received signal strength $P_i$ is further based on a desired signal outage probability $L_i$ for said particular information class i.

7. The method of claim 1 wherein said step of determining a variation measure determines a standard deviation value $\sqrt{\bar{V}}$ of said detected interference magnitude.

8. The method of claim 1 further comprising:

receiving a signal from a wireless terminal indicating a received signal strength of a beacon signal transmitted by said base station; and determining a transmit power level for said terminal $P_{WT}$ based on said determined desired received signal strength $P_i$ and said received signal strength of the beacon signal by said wireless terminal, wherein said information of said supervisory signal corresponds to said determined transmit power $P_{WT}$.

9. The method of claim 1 wherein said information of said supervisory signal includes said determined desired received signal strength $P_i$.

10. The method of claim 1 wherein said steps of the method are performed at the initiation of communication with a wireless terminal.

11. The method of claim 10 wherein said digital multiple access communication method is a spread spectrum multiple access communication method.

12. The method of claim 10 wherein said digital multiple access communication method is a code division multiple access communication method.

13. The method of claim 10 wherein said digital multiple access communication method is a time division multiple access communication method.

14. The method of claim 1 wherein said steps of the method are performed intermittently during communication with a wireless terminal.

15. The method of claim 1 wherein said determined desired received signal strength $P_i$ is for communicating with a wireless terminal by a digital multiple access communication method.

* * * * *

UNITED STATES PATENT AND TRADEMARK OFFICE

CERTIFICATE OF CORRECTION

PATENT NO. : 5,732,328
DATED : March 24, 1998
INVENTOR(S) : Debasis Mitra and John A. Morrison It is certified that error appears in the above-identified patent and that said Letters Patent is hereby corrected as shown below:

Column 12, line 31 renumber claim 11 as 13
           line 34 renumber claim 12 as 14
           line 37 renumber claim 13 as 15
           line 40 renumber claim 14 as 11
           line 43 renumber claim 15 as 12

Claims 11, 12, 13 (to be renumbered as 13, 14m,) all depend on claim 12 (as renumbered), <u>not</u> claim 10.

Signed and Sealed this

Ninth Day of May, 2000

Attest:

Q. TODD DICKINSON

*Attesting Officer*  *Director of Patents and Trademarks*